United States Patent
Hong et al.

(10) Patent No.: US 10,475,582 B2
(45) Date of Patent: Nov. 12, 2019

(54) MULTILAYER CERAMIC CAPACITOR AND METHOD OF MANUFACTURING THE SAME

(71) Applicant: SAMSUNG ELECTRO-MECHANICS CO., LTD., Suwon-si, Gyeonggi-do (KR)

(72) Inventors: Hyuk Jin Hong, Suwon-si (KR); Doo Young Kim, Suwon-si (KR); Byung Soo Kim, Suwon-si (KR); Tae Young Sung, Suwon-si (KR); Youn Sik Jin, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/869,473

(22) Filed: Jan. 12, 2018

(65) Prior Publication Data

US 2019/0096584 A1    Mar. 28, 2019

(30) Foreign Application Priority Data

Sep. 26, 2017  (KR) .................. 10-2017-0124107

(51) Int. Cl.
| | |
|---|---|
| *H01G 4/005* | (2006.01) |
| *H01G 4/012* | (2006.01) |
| *H01G 4/12* | (2006.01) |
| *H01G 4/30* | (2006.01) |
| *H01G 4/228* | (2006.01) |
| *H01G 4/232* | (2006.01) |
| *H01G 13/00* | (2013.01) |

(52) U.S. Cl.
CPC ............... *H01G 4/30* (2013.01); *H01G 4/012* (2013.01); *H01G 4/12* (2013.01); *H01G 4/228* (2013.01); *H01G 4/232* (2013.01); *H01G 13/00* (2013.01)

(58) Field of Classification Search
CPC .......... H01G 4/30; H01G 4/005; H01G 4/232; H01G 4/228; H01G 4/12; H10G 4/232
USPC ............ 361/301.4, 303, 321.1, 306.1, 306.3, 361/321.2
See application file for complete search history.

(56) References Cited

U.S. PATENT DOCUMENTS

2012/0188684 A1* 7/2012 Akazawa ............... H01G 4/012
                                                                361/321.2
2013/0107417 A1  5/2013 Cho et al.
(Continued)

FOREIGN PATENT DOCUMENTS

| JP | 2004-186345 A | 7/2004 |
| KR | 10-2013-0047886 A | 5/2013 |
| KR | 10-2015-0096909 A | 8/2015 |

*Primary Examiner* — Eric W Thomas
*Assistant Examiner* — Arun Ramaswamy
(74) *Attorney, Agent, or Firm* — Morgan, Lewis & Bockius LLP

(57) ABSTRACT

A multilayer ceramic capacitor includes: a body including dielectric layers and first and second internal electrodes alternately disposed with respective dielectric layers interposed therebetween; and first and second external electrodes disposed on the body and connected to the first and second internal electrodes, respectively, wherein the body includes first dummy patterns formed adjacent to the first internal electrodes in a width direction to be spaced apart from the first internal electrodes, and the first dummy patterns are stacked to partially overlap the second internal electrodes.

17 Claims, 11 Drawing Sheets

(56) References Cited

U.S. PATENT DOCUMENTS

2013/0155574 A1\* 6/2013 Park ................ H01G 4/012
                                                    361/321.3
2015/0041197 A1\* 2/2015 Lee ................. H01G 4/005
                                                    174/260

\* cited by examiner

MULTILAYER CERAMIC CAPACITOR AND METHOD OF MANUFACTURING THE SAME

CROSS-REFERENCE TO RELATED APPLICATION(S)

This application claims the benefit of priority to Korean Patent Application No. 10-2017-0124107 filed on Sep. 26, 2017 with the Korean Intellectual Property Office, the disclosure of which is incorporated herein by reference in its entirety.

TECHNICAL FIELD

The present disclosure relates to a multilayer ceramic capacitor and a method of manufacturing the same.

BACKGROUND

A capacitor is an element that may store electricity therein, and when a voltage is applied to the capacitor in a state in which two electrodes are disposed to face each other, the electricity is accumulated in the respective electrodes. In a case in which a direct current (DC) voltage is applied to the capacitor, a current flows in the capacitor while the electricity is accumulated, but when the accumulation of the electricity is completed, the current does not flow in the capacitor. Meanwhile, in a case in which an alternating current (AC) voltage is applied to the capacitor, an AC current continuously flows in the capacitor while polarities of the electrodes are alternated.

Such a capacitor may be divided into several kinds of capacitors such as an aluminum electrolytic capacitor in which electrodes are formed of aluminum and a thin oxide layer is disposed between the electrodes formed of aluminum, a tantalum capacitor in which tantalum is used as an electrode material, a ceramic capacitor in which a dielectric material having a high dielectric constant such as a barium titanate is used between electrodes, a multilayer ceramic capacitor (MLCC) in which ceramic having a high dielectric constant is used in a multilayer structure as a dielectric material provided between electrodes, a film capacitor in which a polystyrene film is used as a dielectric material provided between electrodes, and the like, depending on a kind of insulator provided between electrodes.

The multilayer ceramic capacitor has recently been used mainly in various fields such as a high frequency circuit, and the like, since it has excellent temperature characteristics and frequency characteristics and may be implemented at a small size.

A multilayer ceramic capacitor according to the related art includes a laminate formed by stacking a plurality of dielectric sheets and external electrodes formed on outer surfaces of the laminate and having different polarities, wherein internal electrodes alternately stacked in the laminate may be electrically connected to the respective external electrodes.

As the number of dielectric layers stacked in the multilayer ceramic capacitor is increased, steps due to thickness differences between the internal electrodes and the dielectric layers are increased. These steps cause warpage phenomena of end portions of the internal electrodes due to stretching of the dielectric layers in a transverse direction in a densifying process of compressing a body.

That is, the end portions of the internal electrodes are bent in order to fill the steps, and in margin portions, empty spaces due to the steps are removed by the depression of covers and a reduction in a margin width. The empty spaces due to the steps are removed, such that capacitance layers are also stretched by the reduced margin width. A break down voltage (BDV) of the multilayer ceramic capacitor and reliability of the multilayer ceramic capacitor such as withstand voltage characteristics, or the like, are reduced due to structurally irregular stretching of the internal electrodes as described above.

In order to prevent warpage of the end portions of the internal electrodes, a method of additionally printing separate dielectric layers or dummy electrode patterns in the margin portions has been developed. However, in this case, a separate process should be performed and productivity is thus low, it is difficult to accurately print the dielectric layers or the dummy electrode patterns in the margin portions, and it is difficult to completely prevent warpage of the end portions of the internal electrodes.

SUMMARY

An aspect of the present disclosure may provide a multilayer ceramic capacitor capable of having an improved break down voltage (BDV) by deforming structures of internal electrodes and forming dummy patterns to prevent warpage of end portions of the internal electrodes.

According to an aspect of the present disclosure, a multilayer ceramic capacitor may include: a body including dielectric layers and first and second internal electrodes alternately disposed with respective dielectric layers interposed therebetween; and first and second external electrodes disposed on the body and connected to the first and second internal electrodes, respectively, wherein the body includes first dummy patterns formed adjacent to the first internal electrodes in a width direction to be spaced apart from the first internal electrodes, and the first dummy patterns are stacked to partially overlap the second internal electrodes.

According to another aspect of the present disclosure, a method of manufacturing a multilayer ceramic capacitor may include: preparing a ceramic green sheet for stacking by printing a conductive metal paste on a ceramic green sheet including a dielectric layer to simultaneously form first and second internal electrodes and a first dummy pattern disposed adjacent to the first internal electrode in a width direction to be spaced apart from the first internal electrode; forming a laminate by preparing a plurality of ceramic green sheets for stacking and stacking the plurality of ceramic green sheets for stacking so that the first and second internal electrodes are alternately disposed with respective dielectric layers interposed therebetween and the first dummy patterns partially overlap the second internal electrodes; preparing a body by compressing, sintering, and cutting the laminate; and forming first and second external electrodes on the body to be electrically connected to the first and second internal electrodes, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
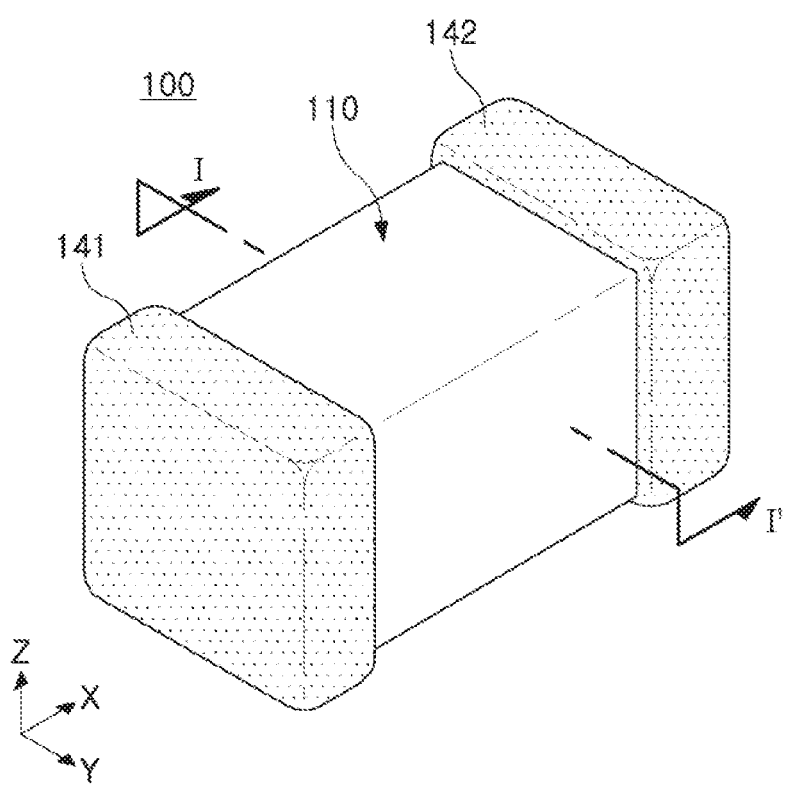
FIG. 1 is a schematic perspective view illustrating a multilayer ceramic capacitor according to an embodiment in the present disclosure.

Hereinafter, embodiments of the present disclosure will now be described in detail with reference to the accompanying drawings. In the accompanying drawings, shapes, sizes and the like, of the components may be exaggerated or shortened for clarity.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being 'on,' 'connected to,' or 'coupled to' another element, it can be directly 'on,' 'connected to,' or 'coupled to' the other element or other elements intervening therebetween may be present. In contrast, when an element is referred to as being 'directly on,' 'directly connected to,' or 'directly coupled to' another element, there may be no other elements or layers intervening therebetween. Like numerals refer to like elements throughout. As used herein, the term 'and/or' includes any and all combinations of one or more of the associated listed items.

It will be apparent that although the terms first, second, third, etc. may be used herein to describe various members, components, regions, layers and/or sections, any such members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as 'above,' 'upper,' 'below,' and 'lower' and the like, may be used herein for ease of description to describe one element's relationship relative to another element(s) as shown in the figures. It will be understood that spatially relative terms are intended to encompass different orientations of the device in use or operation, in addition to the orientation depicted in the figures. For example, if the device in the figures is turned over, elements described as 'above,' or 'upper' relative to other elements would then be oriented 'below,' or 'lower' relative to the other elements or features. Thus, the term 'above' can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms 'a,' 'an,' and 'the' are intended to include the plural forms as well, unless the context clearly indicates otherwise. It will be further understood that the terms 'comprises,' and/or 'comprising' when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted alone, in combination or in partial combination.

The contents of the present disclosure described below may have a variety of configurations and propose only a required configuration herein, but are not limited thereto.

In the drawings, an X direction refers to a first direction or a length direction, a Y direction refers to a second direction or a width direction, and a Z direction refers to a third direction, a thickness direction, or a stacked direction.

Multilayer Ceramic Capacitor

Figure 2:
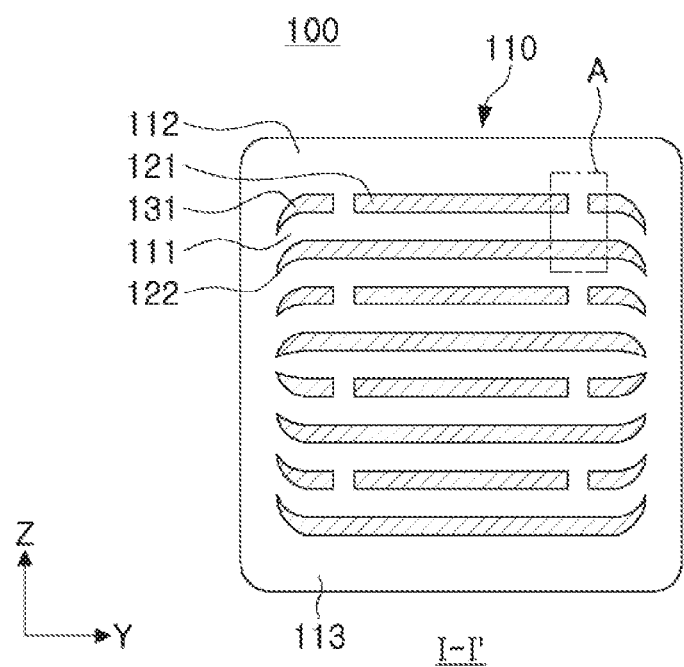
FIG. 2 is a schematic cross-sectional view taken along line I-I' of FIG. 1.
Figure 3:
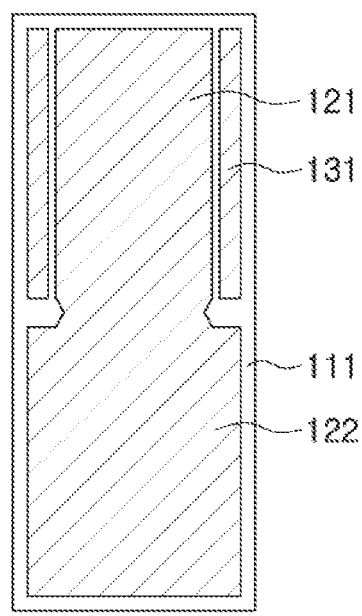
FIG. 3 is a schematic view illustrating a ceramic green sheet for stacking used to manufacture the multilayer ceramic capacitor of FIGS. 1 and 2.

FIG. 1 is a schematic perspective view illustrating a multilayer ceramic capacitor according to an embodiment in the present disclosure. FIG. 2 is a schematic cross-sectional view taken along line I-I' of FIG. 1. FIG. 3 is a schematic view illustrating a ceramic green sheet for stacking used to manufacture the multilayer ceramic capacitor of FIGS. 1 and 2.

Hereinafter, a multilayer ceramic capacitor 100 according to an embodiment in the present disclosure will be described with reference to FIGS. 1 through 3.

Referring to FIG. 1, the multilayer ceramic capacitor 100 according to an embodiment in the present disclosure includes a body 110 and first and second external electrodes 141 and 142 disposed on the body 110 and connected, respectively, to first and second internal electrodes.

The body 110 may have a first main surface and a second main surface opposing each other in the thickness direction (the Z direction), a first side surface and a second side surface opposing each other in the width direction (the Y direction), and a first end surface and a second end surface opposing each other in the length direction (the X direction).

For example, as illustrated in FIG. 1, the first and second external electrodes 141 and 142 are formed on the first and second end surfaces of the body 110, respectively, and are extended up to portions of the first and second main surfaces adjacent to the first and second end surfaces and portions of the first and second side surfaces adjacent to the first and second end surfaces, but are not limited thereto.

Here, portions of the first and second external electrodes 141 and 142 extended from the first and second end surfaces to surfaces adjacent to the first and second end surfaces are called band portions.

Referring to FIG. 2, the body 110 includes dielectric layers 111 and first internal electrodes 121 and second internal electrodes 122 disposed to face each other with respective dielectric layers 111 interposed therebetween.

The body 110 may be formed by stacking and then sintering a plurality of dielectric layers 111 in the thickness direction (the Z direction), and a shape and a dimension of the body 110.

The number of dielectric layers 111 stacked in the body 110 are not limited to those illustrated in the present embodiment.

The plurality of dielectric layers 111 forming the body 110 may be in a sintered state, and adjacent dielectric layers 111 may be integrated with each other so that boundaries therebetween are not readily apparent without using a scanning electron microscope (SEM).

A raw material of the dielectric layer 111 is not particularly limited as long as a sufficient capacitance may be obtained. For example, the raw material of the dielectric layer 111 may be barium titanate ($BaTiO_3$) powder particles. A material of the dielectric layer 111 may be prepared by adding various ceramic additives, organic solvents, plasticizers, binders, dispersing agents, and the like, to powder particles such as the barium titanate ($BaTiO_3$) powder particles, or the like, in accordance with the present disclosure.

The first and second internal electrodes 121 and 122, a pair of electrodes having different polarities, are formed in the stacked direction of the dielectric layers 111 to be alternately exposed to the first and second end surfaces of the body 110 in the length direction (the X direction), respectively, and are electrically insulated from each other by respective dielectric layers 111 interposed therebetween.

The first and second internal electrodes 121 and 122 are alternately exposed through the first and second end surfaces of the body 110 in the length direction (the X direction), respectively, to be thus connected, respectively, to the first and second external electrodes 141 and 142 disposed on outer surfaces of the body 110.

The first and second internal electrodes 121 and 122 may include a conductive metal such as nickel (Ni), copper (Cu), palladium (Pd), silver (Ag), lead (Pb), or platinum (Pt), or alloys thereof.

The body 110 further includes cover portions 112 and 113 formed at an upper portion and a lower portion thereof, respectively. The cover portions 112 and 113 may be formed by stacking dielectric layers on which internal electrodes are not formed. The cover portions 112 and 113 may serve to maintain reliability of the multilayer ceramic capacitor against external impacts.

Figure 4:
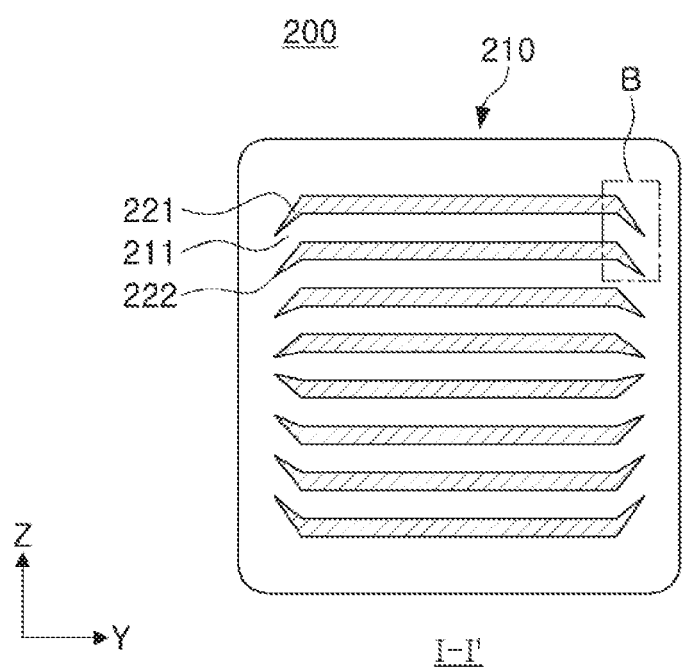
FIG. 4 is a schematic cross-sectional view taken along line I-I' of a multilayer ceramic capacitor according to the related art.
Figure 5:
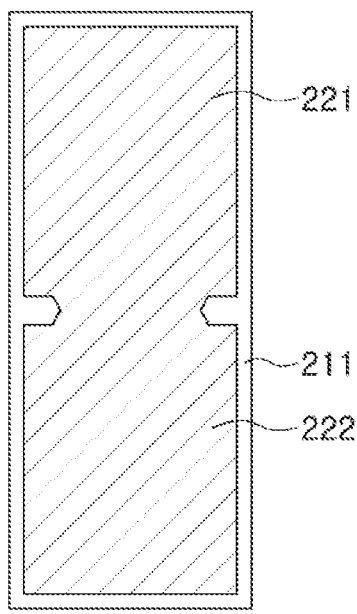
FIG. 5 is a schematic view illustrating a ceramic green sheet for stacking used to manufacture the multilayer ceramic capacitor of FIG. 4.
Figure 6:
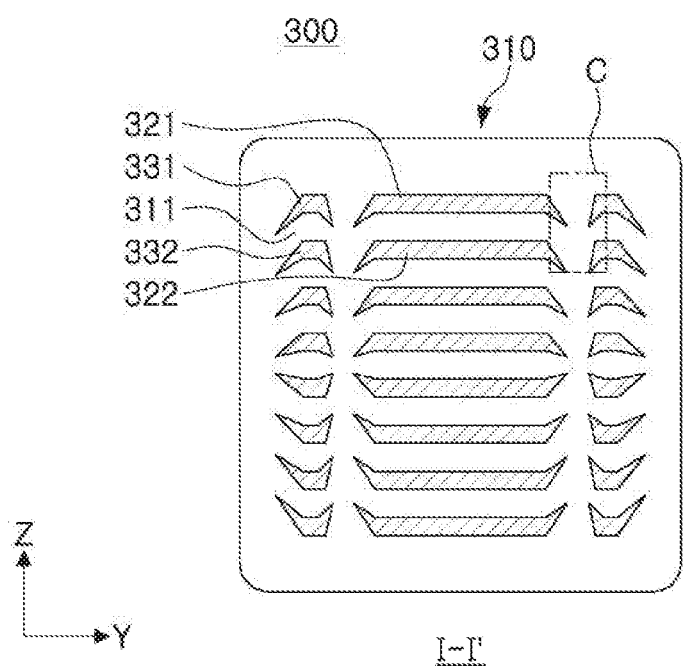
FIG. 6 is a schematic cross-sectional view taken along line I-I' of a multilayer ceramic capacitor according to Comparative Example.
Figure 7:
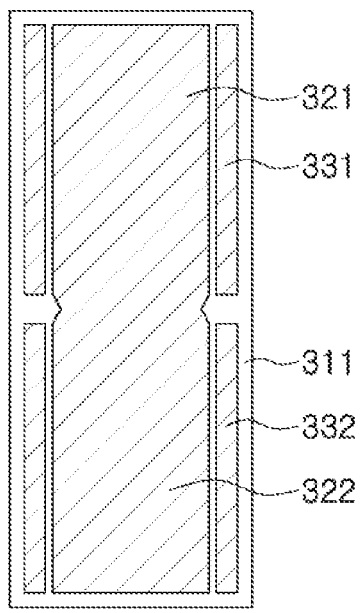
FIG. 7 is a schematic view illustrating a ceramic green sheet for stacking used to manufacture the multilayer ceramic capacitor of FIG. 6.

FIG. 4 is a schematic cross-sectional view taken along line I-I' of a multilayer ceramic capacitor 200 according to the related art. FIG. 5 is a schematic view illustrating a ceramic green sheet for stacking used to manufacture the multilayer ceramic capacitor 200 of FIG. 4. FIG. 6 is a schematic cross-sectional view taken along line I-I' of a multilayer ceramic capacitor 300 according to a Comparative Example. FIG. 7 is a schematic view illustrating a ceramic green sheet for stacking used to manufacture the multilayer ceramic capacitor 300 of FIG. 6.

Referring to FIGS. 4 and 5, in the related art, as the number of dielectric layers stacked in the multilayer ceramic capacitor 200 is increased, steps due to thickness differences between internal electrodes 221 and 222 and the dielectric layers 211 are increased, and these steps cause warpage, as illustrated in box B, of end portions of the internal electrodes due to stretching of the dielectric layers in a transverse direction in a densifying process of compressing the body 210.

An electric field is concentrated on the end portions of the internal electrodes due to warpage B of the end portions of the internal electrodes, such that a deterioration occurrence probability is increased, a break down voltage (BDV) value of the multilayer ceramic capacitor is reduced, and withstand voltage characteristics of the multilayer ceramic capacitor are deteriorated.

In addition, referring to FIGS. 6 and 7, even in a case of the multilayer ceramic capacitor 300 in which separate dummy electrode patterns 331 and 332 are additionally formed in margin portions in order to prevent warpage of the end portions of the internal electrodes, dielectric layers are pushed into spaces between the internal electrodes 321 and 322 and the dummy electrode patterns 331 and 332 in a densifying process of compressing the body 310, such that occurrence of warpage of the end portions of the internal electrodes 321 and 322 may not be completely suppressed, and a process of forming the separate dummy electrode patterns 331 and 332 needs to be performed, resulting in lower productivity.

However, the body 110 of the multilayer ceramic capacitor 100 according to an embodiment in the present disclosure includes first dummy patterns 131 formed adjacent to the first internal electrodes 121 in the width direction to be spaced apart from the first internal electrodes 121, and the first dummy patterns 131 may be stacked to partially overlap the second internal electrodes 122, such that a BDV value of the multilayer ceramic capacitor 100 may be high and withstand voltage characteristics of the multilayer ceramic capacitor 100 may be excellent.

The first dummy patterns 131 may reduce steps due to thickness differences between the internal electrodes and the dielectric layers. In addition, the first dummy patterns 131 may be stacked to overlap the second internal electrodes 122, and the second internal electrodes 122 may thus prevent the dielectric layers from being pushed into spaces in which the first dummy patterns 131 and the first internal electrodes 121 are spaced apart from each other in a densifying process of compressing the body 110. Therefore, as illustrated in A of FIG. 2, the occurrence of warpage of end portions of the first internal electrodes 121 may be suppressed. That is, the second internal electrodes 122 may serve to support the dielectric layers pushed into the spaces to suppress the occurrence of warpage of end portions of the first internal electrodes 121 as much as possible.

In this case, the end portions of the first internal electrodes 121 in the width direction and end portions of the second internal electrodes 122 in the width direction may be disposed to be misaligned with each other or widths of the first internal electrodes 121 and the second internal electrodes 122 may be different from each other so that the first dummy patterns 131 may be stacked to overlap the second internal electrodes 122.

In addition, the first dummy patterns 131 may be formed of the same material as that of the first and second internal electrodes 121 and 122. This is to avoid a separate process by simultaneously printing the first and second internal electrodes 121 and 122 and the first dummy patterns 131 using a conductive paste used at the time of printing the first and second internal electrodes 121 and 122.

In addition, the first dummy patterns 131 may be formed on opposite sides of the first internal electrodes 121 in the width direction to suppress occurrence of warpage of both end portions of the first internal electrodes 121.

In addition, the first dummy patterns 131 are spaced apart from the first internal electrodes 121, and are not connected to the first and second external electrodes. That is, the first dummy patterns 131 are essentially insulated. Therefore, even in a case in which the first dummy patterns 131 are bent at the time of being compressed to be thus connected to the second internal electrodes 122, withstand voltage characteristics may not be affected.

Figure 8:
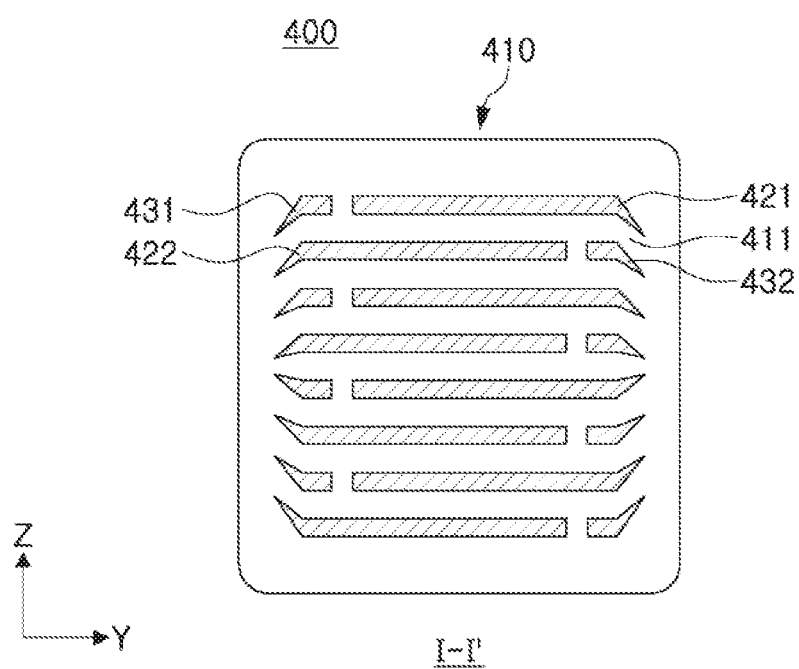
FIG. 8 is a schematic cross-sectional view taken along line I-I' of a multilayer ceramic capacitor according to another embodiment in the present disclosure.
Figure 9:
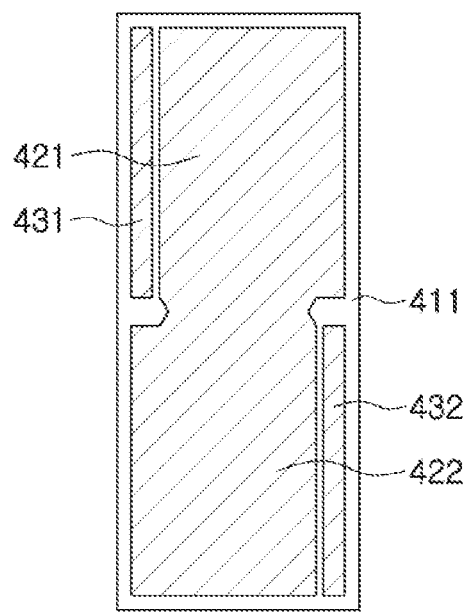
FIG. 9 is a schematic view illustrating a ceramic green sheet for stacking used to manufacture the multilayer ceramic capacitor of FIG. 8.

FIG. 8 is a schematic cross-sectional view taken along line I-I' of a multilayer ceramic capacitor 400 according to another embodiment in the present disclosure. FIG. 9 is a schematic view illustrating a ceramic green sheet for stacking used to manufacture the multilayer ceramic capacitor 400 of FIG. 8.

Referring to FIGS. 8 and 9, a body 410 further includes second dummy patterns 432 formed adjacent to second internal electrodes 422 in the width direction to be spaced apart from the second internal electrodes 422.

The second dummy patterns 432 may be stacked to partially overlap first internal electrodes 421, and the first internal electrodes 421 may thus prevent dielectric layers from being pushed into spaces by which the second dummy patterns 432 and the second internal electrodes 422 are spaced apart from each other in a densifying process of compressing the body 410. Therefore, the occurrence of warpage of end portions of the second internal electrodes 422 may be suppressed.

The first and second dummy patterns 431 and 432 are not connected to the first and second external electrodes. That is, the first and second dummy patterns 431 and 432 are essentially insulated. Therefore, even in the case that the first and second dummy patterns 431 and 432 are bent at the time of being compressed to thus be connected to the second internal electrodes 422 and the first internal electrodes 421, respectively, withstand voltage characteristics may not be affected.

As illustrated in FIG. 9, the first dummy pattern 431 is formed on only a first side of the first internal electrode 421 in the width direction, the second dummy pattern 431 may be formed on only a second side of the second internal electrode 422 in the width direction opposite the first side, and widths of the first and second internal electrodes 421 and 422 may be the same as each other.

Figure 10:
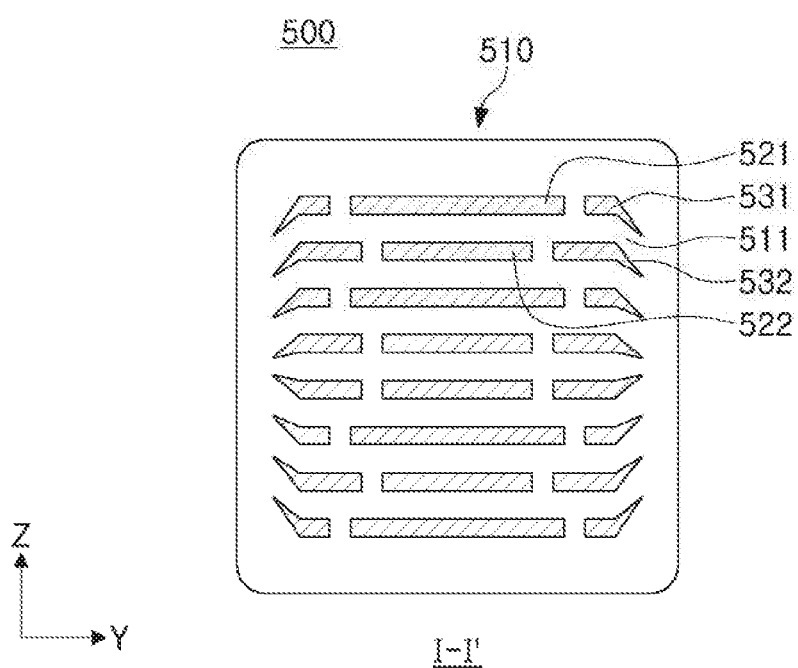
FIG. 10 is a schematic cross-sectional view taken along line I-I' of a multilayer ceramic capacitor according to another embodiment in the present disclosure.
Figure 11:
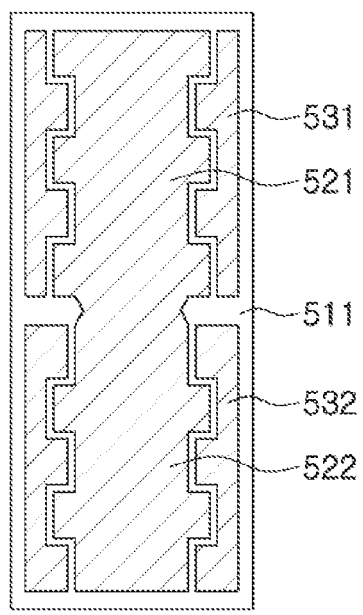
FIG. 11 is a schematic view illustrating a ceramic green sheet for stacking used to manufacture the multilayer ceramic capacitor of FIG. 10.

FIG. 10 is a schematic cross-sectional view taken along line I-I' of a multilayer ceramic capacitor 500 according to another embodiment in the present disclosure. FIG. 11 is a schematic view illustrating a ceramic green sheet for stacking used to manufacture the multilayer ceramic capacitor of FIG. 10.

Referring to FIGS. 10 and 11, in the multilayer ceramic capacitor 500 according to another embodiment in the present disclosure, widths of first and second internal electrodes 521 and 522 may be different from each other, end portions of the first and second internal electrodes 521 and 522 may be disposed to be misaligned with each other, first dummy patterns 531 may be formed on opposite sides of the first internal electrodes 521 in the width direction, and second dummy patterns 532 may be formed on opposite sides of the second internal electrodes 522 in the width direction.

The second dummy patterns 532 may be stacked to partially overlap the first internal electrodes 521. The first internal electrodes 521 may thus prevent dielectric layers from being pushed into spaces by which the second dummy patterns 532 and the second internal electrodes 522 are spaced apart from each other in a densifying process of compressing the body 510, and the first dummy patterns 531 may be stacked to partially overlap the second dummy patterns 532, and the second dummy pattern 532 may thus prevent the dielectric layers from being pushed into spaces by which the first dummy patterns 531 and the first internal electrodes 521 are spaced apart from each other in the densifying process of compressing the body 510.

Method of Manufacturing Multilayer Ceramic Capacitor

A method of manufacturing a multilayer ceramic capacitor according to an embodiment in the present disclosure may include preparing a ceramic green sheet for stacking by printing a conductive metal paste on a ceramic green sheet including a dielectric layer to simultaneously form first and second internal electrodes and a first dummy pattern disposed adjacent to the first internal electrode in a width direction to be spaced apart from the first internal electrode; forming a laminate by preparing a plurality of ceramic green sheets for stacking and stacking the plurality of ceramic green sheets so that the first and second internal electrodes are alternately disposed with respective dielectric layers interposed therebetween and the first dummy patterns partially overlap the second internal electrodes; preparing a body by compressing, sintering, and cutting the laminate; and forming first and second external electrodes on the body to be electrically connected to the first and second internal electrodes, respectively.

A slurry including powder particles such as barium titanate ($BaTiO_3$) powder particles, or the like, may be applied to carrier films and be dried to prepare ceramic green sheets including a plurality of dielectric layers.

The ceramic green sheet including the dielectric layer may be manufactured by mixing ceramic powder particles such as the barium titanate ($BaTiO_3$) powder particles, binders, solvents, and the like, with one another to prepare a slurry and manufacturing the slurry in a sheet shape having a thickness of several micrometers by a doctor blade method.

Then, a conductive paste including a conductive metal may be prepared. The conductive metal may be nickel (Ni), copper (Cu), palladium (Pd), silver (Ag), lead (Pb), or platinum (Pt), or alloys thereof, may have an average particle size of 0.1 to 0.2 μm, and a conductive paste for an internal electrode including 40 to 50 wt % of the conductive metal may be prepared.

The conductive paste may be applied to the ceramic green sheet including the dielectric layer by a printing method, or the like, to simultaneously form the first and second internal electrodes and the first dummy pattern disposed adjacent to the first internal electrode in the width direction to be spaced apart from the first internal electrode, thereby preparing the ceramic green sheet for stacking. A method of printing the conductive paste may be a screen printing method, a gravure printing method, or the like, but is not limited thereto.

Here, at the time of printing the conductive metal paste, a second dummy pattern may be further formed adjacent to the second internal electrode in the width direction to be spaced apart from the second internal electrode.

Then, the plurality of ceramic green sheets for stacking may be prepared, and be stacked so that the first and second internal electrodes are alternately disposed with respective dielectric layers interposed therebetween and the first dummy patterns partially overlap the second internal electrodes, thereby forming the laminate. Here, in a case in which the second dummy patterns are formed, the second dummy patterns may be stacked to partially overlap the first internal electrodes.

Meanwhile, the number of stacked ceramic green sheets for stacking may be adjusted depending on a capacitance of the multilayer ceramic capacitor.

Ceramic sheets on which internal electrode patterns are not printed may be stacked on upper and lower surfaces of the laminate to form cover portions.

Then, the laminate may be compressed, sintered, and cut to prepare the body.

Then, the first and second external electrodes may be formed on the body to be electrically connected to the first and second internal electrodes, respectively.

The first and second external electrodes may be formed on the body by applying a conductive paste on the body or performing a thin film deposition method such as sputtering, chemical vapor deposition (CVD), physical vapor deposition (PVD), spin coating, atomic layer deposition (ALD), pulsed laser deposition (PLD), or the like, or an electroless plating method, but are not limited thereto.

In addition, plating layers may be formed on the first and second external electrodes, if necessary, but are not limited thereto.

As set forth above, in the multilayer ceramic capacitor according to embodiments in the present disclosure, structures of the internal electrodes of the multilayer ceramic capacitor may be deformed and the dummy patterns may be formed to prevent warpage of the end portions of the internal electrodes, resulting in improvement of the break down voltage (BDV) of the multilayer ceramic capacitor. In addition, the reliability and the withstand voltage characteristics of the multilayer ceramic capacitor may be improved, and productivity may be improved by simplifying a process.

While embodiments have been shown and described above, it will be apparent to those skilled in the art that modifications and variations could be made without departing from the scope of the present invention as defined by the appended claims.

What is claimed is:

1. A multilayer ceramic capacitor comprising:
a body including dielectric layers and first and second internal electrodes alternately disposed with respective dielectric layers interposed therebetween; and
first and second external electrodes disposed on the body opposing each other in a length direction, and connected to the first and second internal electrodes, respectively,
wherein the body includes first dummy patterns formed adjacent to the first internal electrodes in a width direction to be spaced apart from the first internal electrodes and extending along a length of the first internal electrodes, the first dummy patterns are insulated from, and not connected to, the first and second external electrodes, and
the first dummy patterns are stacked to partially overlap the second internal electrodes.

2. The multilayer ceramic capacitor of claim 1, wherein end portions of the first internal electrodes in the width direction and end portions of the second internal electrodes in the width direction are disposed to be misaligned with each other.

3. The multilayer ceramic capacitor of claim 1, wherein the first dummy patterns are formed of the same material as that of the first and second internal electrodes.

4. The multilayer ceramic capacitor of claim 1, wherein the first dummy patterns are formed on opposite sides of the first internal electrodes in the width direction.

5. The multilayer ceramic capacitor of claim 1, wherein widths of the first and second internal electrodes are different from each other.

6. The multilayer ceramic capacitor of claim 1, wherein the body further includes second dummy patterns formed adjacent to the second internal electrodes in the width direction to be spaced apart from the second internal electrodes.

7. The multilayer ceramic capacitor of claim 6, wherein the second dummy patterns are stacked to partially overlap the first internal electrodes.

8. The multilayer ceramic capacitor of claim 6, wherein the first and second dummy patterns are not connected to the first and second external electrodes.

9. A multilayer ceramic capacitor comprising:
a body including dielectric layers and first and second internal electrodes alternately disposed with respective dielectric layers interposed therebetween; and
first and second external electrodes disposed on the body and connected to the first and second internal electrodes, respectively,
wherein the body includes first dummy patterns formed adjacent to the first internal electrodes in a width direction to be spaced apart from the first internal electrodes, the first dummy patterns are not connected to, the first and second external electrodes, and second dummy patterns formed adjacent to the second internal electrodes in the width direction to be spaced apart from the second internal electrodes,
the first dummy patterns are stacked to partially overlap the second internal electrodes, and
the first dummy pattern is formed on only a first side of the first internal electrode in the width direction, the second dummy pattern is formed on only a second side opposite the first side of the second internal electrode in the width direction.

10. The multilayer ceramic capacitor of claim 9, wherein widths of the first and second internal electrodes are the same as each other.

11. A method of manufacturing a multilayer ceramic capacitor, comprising:
preparing a ceramic green sheet for stacking by printing a conductive metal paste on a ceramic green sheet including a dielectric layer to simultaneously form first and second internal electrodes and a first dummy pattern disposed adjacent to the first internal electrode in a width direction to be spaced apart from the first internal electrode and extending along a length of the first internal electrodes;
forming a laminate by preparing a plurality of ceramic green sheets for stacking and stacking the plurality of ceramic green sheets for stacking so that the first and second internal electrodes are alternately disposed with respective dielectric layers interposed therebetween and the first dummy patterns partially overlap the second internal electrodes;
preparing a body by compressing, sintering, and cutting the laminate; and
forming first and second external electrodes on end surfaces of the body opposed in a length direction to be electrically connected to the first and second internal electrodes, respectively,
wherein the first dummy pattern is insulated from and not connected to the first and second external electrodes.

12. The method of claim 11, wherein in the forming of the laminate, the plurality of ceramic green sheets for stacking are stacked so that end portions of the first internal electrodes in the width direction and end portions of the second internal electrodes in the width direction are disposed to be misaligned with each other.

13. The method of claim 11, wherein in the preparing of the ceramic green sheet for stacking, second dummy patterns are further formed adjacent to the second internal electrodes in the width direction to be spaced apart from the second internal electrodes at the time of printing the conductive metal paste.

14. The method of claim 13, wherein in the forming of the laminate, the second dummy patterns are stacked to partially overlap the first internal electrodes.

15. The method of claim 11, wherein the first dummy patterns are not connected to the first and second external electrodes.

16. The method of claim 11, wherein a thickness of the first dummy pattern is selected to reduce a step portion resulting from a difference between a thickness of the first and second internal electrodes and that of the dielectric layer.

17. A multilayer ceramic capacitor comprising:
a body including dielectric layers and first and second internal electrodes alternately disposed with respective dielectric layers interposed therebetween; and
first and second external electrodes disposed on end surfaces of the body opposed in a length direction and connected to the first and second internal electrodes, respectively,
wherein the body includes first dummy patterns formed adjacent to the first internal electrodes in a width direction to be spaced apart from the first internal electrodes and extending along a length of the first internal electrodes, the first dummy patterns being insulated from and not connected to the first and second external electrodes, and
the first dummy patterns are stacked to partially overlap the second internal electrodes.

* * * * *